United States Patent Office 3,647,849
Patented Mar. 7, 1972

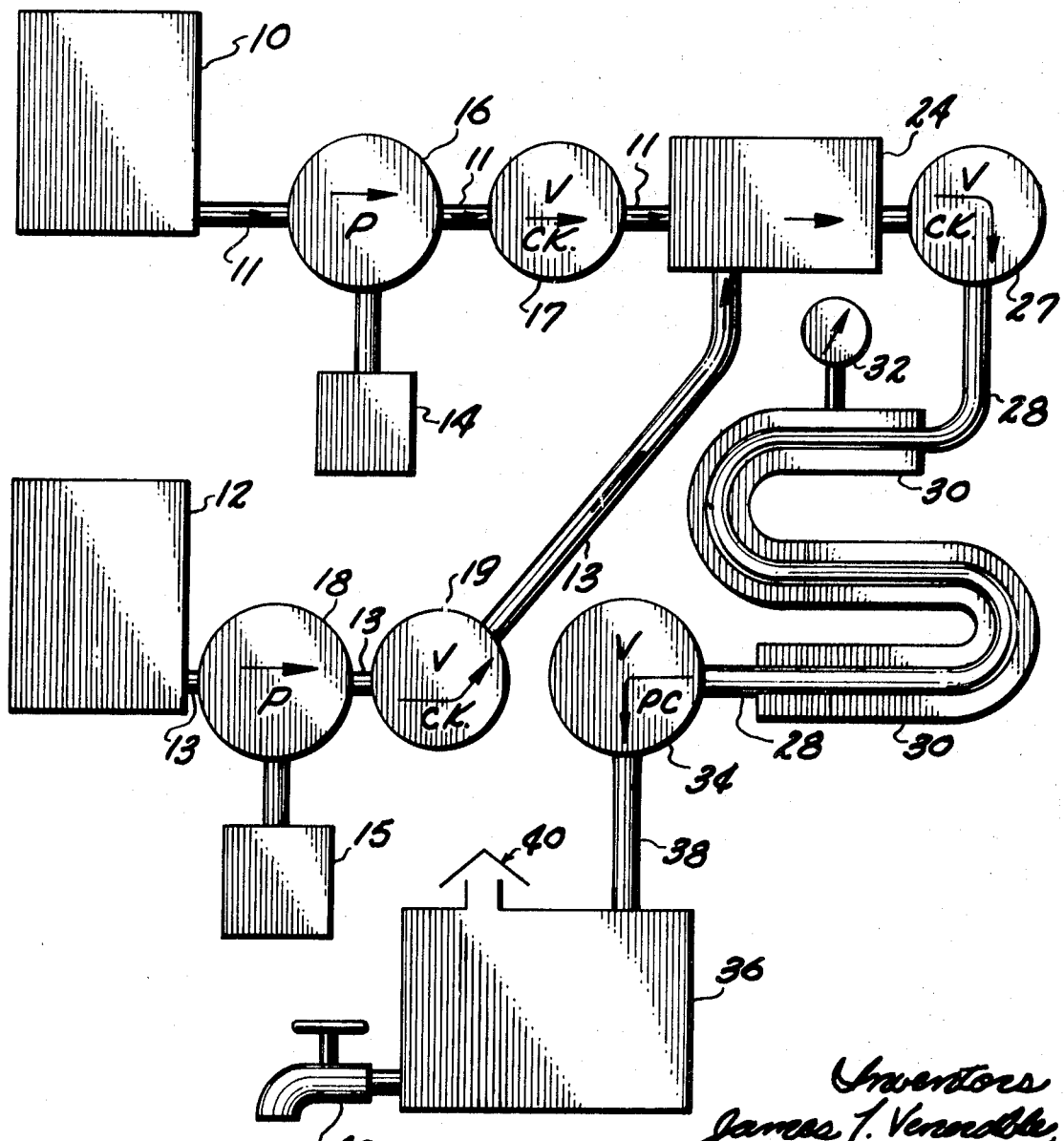

3,647,849
PRODUCTION OF ALKYL THIOCYANATES
James T. Venerable, Huntley, James Miyashiro, Woodstock, and Alfred W. Seiling, Crystal Lake, Ill., assignors to Morton International, Inc., Chicago, Ill.
Continuation-in-part of application Ser. No. 458,559, May 25, 1965. This application Jan. 17, 1968, Ser. No. 704,973
Int. Cl. C07c 161/02
U.S. Cl. 260—454
11 Claims

ABSTRACT OF THE DISCLOSURE

A process for preparing lower alkyl thiocyanates which comprises reacting a thiocyanate with a lower alkyl halide in an aqueous medium under elevated temperature and pressure conditions.

---

This application is a continuation-in-part of Ser. No. 458,559 filed May 25, 1965 now abandoned.

This invention relates to improvements in the preparation of lower alkyl thiocyanate compounds, and particularly to the preparation of methyl thiocyanates.

BACKGROUND OF INVENTION

Alkyl thiocyanates are highly useful compounds per se in the field of agricultural chemistry and as intermediates in the synthesis of isothiocyanates, thiocarbamates, disulfides, thioureas and other organic compounds having utility as pesticides and as curing agents for elastomers.

The preparation of alkyl thiocyanates by the reaction of alkyl halides with inorganic thiocyanates is known to the prior art. However, an examination of the prior art reveals that the alkyl halides employed are the more reactive alkyl bromides and iodides rather than the alkyl chlorides. In those instances where the less reactive alkyl chloride is employed, the alkyl group is either attached to an activating group such as phenyl or naphthyl or the reaction is carried out by a batch process in an activating solvent such as an alcohol or a ketone. These restrictions on the activity of the reactants and the nature of the solvent make the prior art processes for the provision of these thiocyanates rather inflexible and costly.

Accordingly, it would be desirable to provide a continuous, simplified process for preparing lower alkyl thiocyanates by reacting the corresponding alkyl chloride with an inorganic thiocyanate without the necessity of employing organic solvents.

The present invention, accordingly, relates to the preparation of lower alkyl thiocyanates, particularly methyl thiocyanate, by a continuous process, in which the corresponding alkyl chloride is reacted with an inorganic thiocyanate in an aqueous medium.

It was surprisingly found that activating solvents, such as alcohol or acetone, were not required and that water could be used as the solvent medium in the reaction between an inorganic thiocyanate and a lower alkyl chloride, provided that proper conditions of temperature, pressure, and reaction time were established. One important advantage in the use of water as the reaction medium rather than alcohol or acetone is that water is a superior solvent for the dissolution of the inorganic chloride by-product formed in the reaction. This obviates the waste disposal problem which inheres in the use of organic solvents which display poor solvation for inorganic chlorides. The employment of an organic solvent in this reaction causes deposition within the reactor of an inorganic chloride which, of course, requires frequent removal to prevent clogging of the apparatus and obstruction of valves and feed lines. A further advantage lies in the greater economy achieved by the use of water rather than costly organic solvents.

SUMMARY OF THE INVENTION

Accordingly, in one broad form, the present invention comprises a process for producing an alkyl thiocyanate containing up to four carbon atoms in the alkyl group by reacting the corresponding alkyl chloride with an aqueous solution of an inorganic thiocyanate under conditions of elevated temperature and pressure.

The conditions of operation depend to some extent on whether the process is continuous or batch. Generally, however, temperature ranges from as low as 45 degrees are operable, although yields that are practical are not achieved unless temperatures are somewhat higher, such as for example, 60° C. Pressure is also required to produce adequate yields with a low of about ⅔ atmosphere pressure being required at most temperatures. When operating in the continuous process temperatures of from about 80° C. to about 160° C. are employed, preferably from 85 to 160° C., and most preferred from 135 to 160° C. At a given pressure, the rate of reaction increases with a given increase in temperature. Pressures in continuous processing may range upwards of one atmosphere, preferably 2 atmospheres (30 p.s.i.g.) to as high as 3500 p.s.i.g., preferably from 1000 to 3000 p.s.i. The most basic requirement in continuous processing is maintaining the alkyl halide in the liquid state to eliminate the possibility of vapor lock in the proportionating pump as shown in the attached drawing.

The reaction may also be carried out in an autoclave by a batch process operation where a pressure as low as about ⅔ atmosphere or 10 pounds per square inch gauge may be conveniently employed. It is understood that in a batch process, operation at a pressure lower than that of a continuous process is possible because it is not necessary to maintain the methyl chloride in a liquid state and because a longer reaction time is tolerable.

Thus, pressures as low as 10 p.s.i. can be conveniently employed, although it is preferred to use pressures of from about 30 to 45 p.s.i. in a typical batch process with good results being obtained up to 150 p.s.i. and above. The temperatures may range from about 40 to 150° C., preferably from 85 to 100° C. using the batch technique. This makes it possible to use conventional low pressure equipment in this process.

It is understood, and will be appreciated by those skilled in the art, that temperature, pressure and reaction time are coordinated, whether operating by a continuous or batch process, to attain an optimum operating state and maximum yield in a minimum length of time, consistent with sound economic practices.

In one embodiment of this invention for the continuous production of methyl thiocyanate, an aqueous solution containing about 35 percent by weight of ammonium thiocyanate is pumped into a high pressure tube reactor maintained at a pressure of about 3000 pounds per square inch and at a temperature of about 155° C. Methyl chloride is proportioned into the tube at a rate to provide a 2 percent excess over the stoichiometric requirement for reaction with ammonium thiocyanate. The length of the reactor and the flow rate of reactants are coordinated to provide a reaction time of about 8 minutes at the preferred conditions of temperature and pressure. The reaction mixture is discharged from the tube, collected and steam distilled to provide a yield of about 95 percent methyl thiocyanate having a purity in excess of 99 percent.

In another embodiment of this invention, using a batch process technique, methyl chloride is bubbled into an aqueous solution containing 50 percent by weight of ammonium thiocyanate at a pressure of 45 p.s.i. and a temperature of 85° C. to give a yield of 92 percent in 2 hours following the same recovery procedure as described above.

The attached drawing is a schematic representation of one embodiment of an apparatus useful in the production of alkyl thiocyanates by the continuous process of the present invention. As illustrated in that drawing, alkyl halide is contained in storage tank 10 and aqueous inorganic thiocyanate is contained in storage tank 12. Motor 14 actuates proportionating pump 16 which feeds a measured quantity of alkyl halide from tank 10 through line 11 to mixing chamber 24. Motor 15 actuates proportionating pump 18 which feeds a measured quantity of aqueous inorganic thiocyanate from storage tank 12 through line 13 to mixing chamber 24. Check valves 17 and 19 are provided as indicated on lines 11 and 13, respectively. Mixing of the alkyl halide and aqueous inorganic thiocyanate is accomplished in mixing chamber 24 by means of turbulent flow.

The thoroughly admixed alkyl halide and aqueous inorganic thiocyanate are passed into high pressure reactor tube 28, equipped with check valve 27. Reactor tube 28 provides a confined steam heated reaction zone. The reactor tube may be composed of any corrosion-resistant material, such as stainless steel or the like, capable of withstanding high pressure.

Heating jacket 30 encloses reactor tube 28 and may be adjusted to provide a temperature ranging up to about 165° C. within the reactor. The heating jacket is conveniently provided with a thermometer 32, or other temperature sensing devices may also be employed. Pressure control valve 34 is cooperatively connected to tube reactor 28. The regulation of control valve 34 serves to maintain a desired pressure within the reactor. The reaction products are conducted through valve 34 and thence through line 38 to receiving tank 36 which is equipped with vent 40. Receiving tank 36 is air-cooled at ambient temperature as it is desirable to avoid excessive cooling which would cause the ammonium chloride by-product formed in the reaction to crystallize out and form an unwanted deposit. The crude thiocyanate product is removed from tank 36 via tap 42 for further purification. It is also possible to recycle (not shown) excess methyl chloride recovered through vent 40. However, in the instance where only a 2 percent excess of methyl chloride is employed, it is more convenient to allow it to escape than to attempt its recovery.

For a more complete understanding of the process, reference is had to the following specific examples illustrating the present invention carried out in the above described apparatus.

In the Examples I through V the reactor tube used in the continuous process embodiment was about 180 lineal feet of ¼ inch I.D. stainless steel pressure tubing having a reaction zone volume of about 1800 milliliters. Example VI and those that follow are batch processes carried out in an autoclave.

EXAMPLE I

Methyl chloride and an aqueous solution of ammonium thiocyanate containing 35 percent by weight of ammonium thiocyanate were introduced under pressure into a continuous reactor tube. The reactor tube was brought to an operating pressure of about 3000 pounds per square inch and a temperature of 155° C. The rate of flow of methyl chloride and of the ammonium thiocyanate solution through the reactor tube was adjusted to provide an excess of about 10 percent by weight of methyl chloride and an effective reaction time of approximately 8 minutes. The resulting crude methyl thiocyanate product was then separated from the aqueous reaction mixture by steam distillation. The yield of purified methyl thiocyanate obtained was 91.5 percent of theory on an ammonium thiocyanate basis and the product assayed 99 percent pure by gas chromatographic analysis.

EXAMPLE II

Methyl chloride and an aqueous solution of ammonium thiocyanate containing 35 percent by weight of ammonium thiocyanate were introduced under pressure into a continuous reactor tube. The reactor tube was brought to an operating pressure of about 3000 pounds per square inch and a temperature of about 115° C. The rate of flow of methyl chloride and ammonium thiocyanate through the reactor tube was adjusted to provide an excess of about 2 percent of methyl chloride and an effective reaction time of approximately twenty-five minutes. The yield of purified methyl thiocyanate obtained was 89.4 percent of the theoretical yield based on ammonium thiocyanate.

EXAMPLE III

Methyl chloride and an aqueous solution of ammonium thiocyanate containing 35 percent by weight of ammonium thiocyanate were introduced into a continuous reactor tube. The reactor tube was brought to an operating pressure of about 1000 pounds per square inch and a temperature of about 95° C. The rate of flow of methyl chloride and ammonium thiocyanate through the reactor tube was adjusted to provide an excess of about 2 percent of methyl chloride and an effective reaction time of approximately forty-seven minutes. The yield of crude methyl thiocyanate obtained was 98 percent.

EXAMPLE IV

Methyl chloride and an aqueous solution of ammonium thiocyanate containing 35 percent by weight of ammonium thiocyanate were introduced into a continuous reactor tube. The reactor tube was brought to an operating pressure of about 500 pounds per square inch and a temperature of about 95° C. The rate of flow of methyl chloride and ammonium thiocyanate through the reactor tube was adjusted to provide an excess of about 10 percent of methyl chloride and an effective reaction time of approximately forty-five minutes. The yield of crude methyl thiocyanate obtained was 95.5 percent.

EXAMPLE V n-Butyl chloride and an aqueous solution of ammonium thiocyanate containing 35 percent by weight of ammonium thiocyanate were introduced into a continuous reactor tube. The reactor tube was brought to a pressure of about 3000 pounds per square inch and a temperature of about 130° C. The rate of flow of n-butyl chloride and ammonium thiocyanate was adjusted to provide an excess of about 2 percent of n-butyl chloride. After the completion of the reaction, pure n-butyl thiocyanate was isolated by distillation.

EXAMPLE VI

A 50 percent aqueous solution of ammonium thiocyanate was placed in a pressure reactor (autoclave). The reactor was closed, vigorous agitation was started, and the solution was heated to 90° C. Methyl chloride was introduced into the reactor and the pressure rose to 150 to 180 pounds per square inch. After a reaction time of about one hour, as indicated by a pressure drop to approximately atmospheric pressure, the reactor was vented. The contents were steam distilled to obtain a 95 percent yield of pure methyl thiocyanate.

EXAMPLE VII

A glass-lined Pfaudler kettle was equipped with a stirrer, an external heating and cooling jacket, a thermocouple, a methyl chloride inlet tube, a condenser and a receiver. A 50% aqueous ammonium thiocyanate solution (5.45 kg. in 5.45 liters of water) was charged into the kettle. The system was purged with methyl chloride, closed to the atmosphere, and then methyl chloride was introduced at a constant pressure of 15 p.s.i.g.

The temperature of the reaction mixture was elevated to 80°–85° C. and maintained in this range throughout the reaction. After 7 hours the reaction was completed as indicated by negligible absorption of methyl chloride. The reaction mixture was then cooled to 25° C., water was added and the upper oil layer comprising crude wet methyl thiocyanate was separated. The lower aqueous layer was returned to the kettle and steam distilled to recover any dissolved methyl thiocyanate. The total wet methyl thiocyanate was dried by azeotropic distillation to give a total yield of 4.93 kg. (94.3% of theoretical based on ammonium thiocyanate) of dry methyl thiocyanate assaying 99.8% pure.

EXAMPLES VIII THROUGH XVI

Various runs were carried out using the procedures of Example VII at different pressures and temperatures. The following table gives the variables of operating conditions and the results:

| Example | Temp. (° C.) | Pressure (p.s.i.g.) | Time (min.) | Percent Yield [1] | Percent Purity |
|---|---|---|---|---|---|
| VIII | 85 | 30 | 235 | 95.7 | 99.1 |
| IX | 85 | 26–43 | 180 | 90.5 | 99+ |
| X | 85 | 45 | 120 | 92.2 | 99.7 |
| XI | 95 | 30 | 200 | 96.0 | 99+ |
| XII | 100 | 45 | 70 | 95.0 | 99.7 |
| XIII | 85 | 15 | 425 | 94.3 | 99.8 |
| XIV | 85 | 10 | 555 | 83.7 | 99.8 |
| XV | 60 | 45 | 462 | 90.8 | 99.8 |
| XVI | 85 | 30 | 190 | [2] 84 | 99.8 |

[1] Yield based on ammonium thiocyanate.
[2] Sodium thiocyanate (30% solution) was substituted for ammonium thiocyanate as a starting material.

While several particular embodiments of this invention are shown above, it will be understood, of course, that the invention is not limited thereto, since many modifications may be made, and it is contemplated, therefore, by the appended claims, to cover any such modifications as fall within the true spirit and scope of this invention.

We claim:
1. A process for preparing an alkyl monothiocyanate containing from one to four carbon atoms in the alkyl group from the corresponding alkyl monochloride which comprises reacting an alkyl monochloride containing from one to four carbon atoms in the alkyl group with an aqueous solution consisting essentially of water and from about 5 to about 60 weight percent of an inorganic thiocyanate selected from the group consisting of ammonium thiocyanate, sodium thiocyanate and potassium thiocyanate, the reaction being carried out at a pressure of from about 10 to about 3500 pounds per square inch and a temperature of from about 45° C. to about 160° C., and thereafter separating the alkyl monothiocyanate product.

2. The process of claim 1 wherein the alkyl thiocyanate is methyl thiocyanate and the alkyl chloride is methyl chloride.

3. The process of claim 1 wherein the alkyl thiocyanate is ethyl thiocyanate and the alkyl chloride is ethyl chloride.

4. The process of claim 1 wherein the alkyl thiocyanate is propyl thiocyanate and the alkyl chloride is propyl chloride.

5. The process of claim 1 wherein the alkyl thiocyanate is butyl thiocyanate and the alkyl chloride is butyl chloride.

6. A continuous process according to claim 1 for preparing an alkyl thiocyanate containing from one to four carbon atoms in the alkyl group from the corresponding alkyl chloride which comprises reacting an alkyl chloride containing from one to four carbon atoms in the alkyl group with an aqueous solution consisting essentially of water and an inorganic thiocyanate selected from the group consisting of ammonium thiocyanate, sodium thiocyanate and potassium thiocyanate, the reaction being carried out at a pressure of from about 10 to about 3500 pounds per square inch, and a temperature of from about 80° C. to about 160° C., and thereafter separating and recovering the resulting alkyl thiocyanate product.

7. A continuous process according to claim 1 for preparing methyl thiocyanate which comprises reacting methyl chloride with an aqueous solution consisting essentially of water and ammonium thiocyanate at a temperature of from about 85° C. to about 160° C. and a pressure of from about 1000 to about 3000 pounds per square inch, and thereafter separating the methyl thiocyanate product.

8. A continuous process according to claim 7 for preparing methyl thiocyanate which comprises reacting methyl chloride with an aqueous solution consisting essentially of water and ammonium thiocyanate containing from about 20 to about 50 weight percent of ammonium thiocyanate at a temperature of from about 135° C. to about 160° C. and a pressure of from about 1000 to about 3000 pounds per square inch and thereafter separating the methyl thiocyanate product.

9. A batch process according to claim 1 wherein the pressure is maintained between about 30 and 150 p.s.i.g.

10. A batch process according to claim 1 wherein the pressure is maintained between about 30 and 150 p.s.i.g. and the temperature between about 85° and 100° C.

11. A batch process according to claim 1 wherein the pressure is maintained between about 10 and 150 p.s.i.g. and the temperature between about 45 and 150° C.

References Cited
UNITED STATES PATENTS 3,444,186   5/1969   Sakai et al. _____ 260—454

LEWIS GOTTS, Primary Examiner

G. HOLLRAH, Assistant Examiner

UNITED STATES PATENT OFFICE
CERTIFICATE OF CORRECTION

Patent No. 3,647,849          Dated March 7, 1972

Inventor(s) James T. Venerable, James Miyashiro and Alfred W. Seiling

It is certified that error appears in the above-identified patent and that said Letters Patent are hereby corrected as shown below:

Col. 3, l. 23     - "steam" should be "stream"

---

References:

References Not Cited:

| | | | | |
|---|---|---|---|---|
| 1,859,399 | 5-1932 | Kaufmann | 260 | 454 |
| 2,077,478 | 4-1937 | Hollander, et al. | 260 | 454 |
| 3,223,685 | 12-1965 | Lynn | 260 | 454 |

Signed and sealed this 22nd day of August 1972.

(SEAL)
Attest:

EDWARD M. FLETCHER, JR.          ROBERT GOTTSCHALK
Attesting Officer                 Commissioner of Patents